United States Patent [19]
Ball et al.

[11] Patent Number: 4,863,124
[45] Date of Patent: Sep. 5, 1989

[54] CORNER WORK CENTER

[75] Inventors: Douglas C. Ball, Quebec, Canada; George E. Sherbourne, Southington; Jeffrey M. Gioitta, Mayfield Village, both of Ohio

[73] Assignee: Hauserman, Inc., Ceveland, Ohio

[21] Appl. No.: 148,377

[22] Filed: Jan. 25, 1988

Related U.S. Application Data

[63] Continuation-in-part of Ser. No. 673,511, Nov. 20, 1984.

[51] Int. Cl.$^4$ ............................................. F16M 13/00
[52] U.S. Cl. ..................... 108/28; 248/458; 248/282; 248/918; 248/186; 403/91; 108/42; 108/94
[58] Field of Search ............... 248/639, 660, 662, 664, 248/670, 674, 676, 447, 447.1, 458, 282, 310, 316.4, 349, 345.1, 1 A, 1 B, 1 E; 108/28, 29; 403/103, 91, 94

[56] References Cited

U.S. PATENT DOCUMENTS

| | | |
|---|---|---|
| 297,882 | 4/1884 | Waggonner ............... 403/91 |
| 679,058 | 7/1901 | Mellen ..................... 403/94 |
| 999,283 | 8/1911 | White ....................... 248/282 |
| 1,709,898 | 4/1929 | Cunneen ................... 248/74.1 |
| 1,983,981 | 12/1934 | Hanson ..................... 248/458 |
| 2,044,589 | 6/1936 | Morgan ..................... 248/458 |
| 2,696,996 | 12/1954 | Engelhardt ............... 403/91 |
| 3,176,602 | 4/1965 | Wilt ........................... 248/310 |
| 3,319,280 | 5/1967 | Trachsler ................. 403/91 |
| 3,479,632 | 11/1969 | Galles ....................... 248/349 |
| 4,106,739 | 8/1978 | Gasser ....................... 248/345.1 |
| 4,305,563 | 12/1981 | Presson ..................... 248/639 |
| 4,456,315 | 6/1984 | Markley ..................... 248/345.1 |
| 4,482,063 | 10/1984 | Berke . | |
| 4,562,987 | 1/1986 | Leeds ......................... 248/1 B |
| 4,648,574 | 3/1987 | Granlund ................... 248/349 |
| 4,706,919 | 11/1987 | Soberalski ................. 248/293 |

FOREIGN PATENT DOCUMENTS

| | | |
|---|---|---|
| 2920360 | 11/1980 | Fed. Rep. of Germany . |
| 3311161 | 9/1984 | Fed. Rep. of Germany ...... 248/188 |
| 1329779 | 6/1962 | France ...................... 108/28 |

OTHER PUBLICATIONS

Davis, Jr., M. F., "IBM Technical Disclosure Bulletin", vol. 22, No. 7, Dec., 1979, pp. 2631-2632.

Primary Examiner—Ramon O. Ramirez
Assistant Examiner—Robert A. Olson
Attorney, Agent, or Firm—Renner, Otto, Boisselle & Sklar

[57] ABSTRACT

A corner work center includes a mounting unit for a computer and like equipment which quickly attaches to two adjoining surfaces at the same height. The unit eliminates the need for an expensive and complex intermediate or third top and the requisite hardware. The unit includes an elevated plate mounted on the frame and a forward tray or bridging surface which is captured by the frame and extends forwardly of the frame at a lower elevation and bridges the included angle between the adjoining surfaces. The unit may also include an articulating arm assembly having a positionable keyboard tray which may be positioned beneath and forwardly of the forward tray. With the arm assembly the keyboard tray can be extended for use or retracted when not in use. The tray includes handles and adjustable bumpers. The unit also includes one or more swing arm supports secured to the frame to position computer components or accessories at desired locations for effective use. The swing arm supports include trays and swivel assemblies supporting the trays which allow the trays to be rotated and angularly adjusted relative to the frame of the unit.

17 Claims, 4 Drawing Sheets

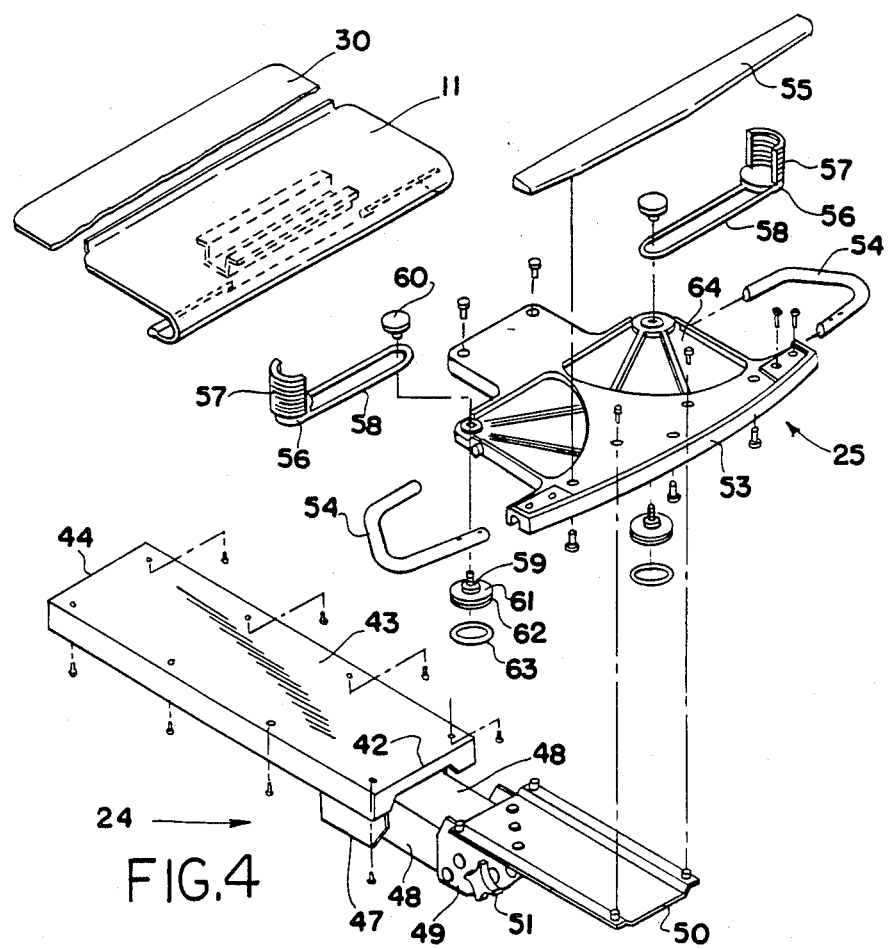
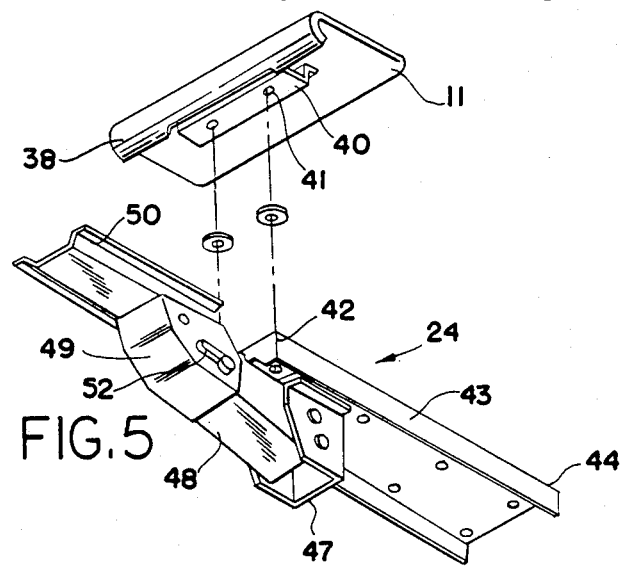

CORNER WORK CENTER

DISCLOSURE

This invention relates generally as indicated to a corner work center and more particularly to an improved corner mounting unit for computers, related equipment, and accessories. This application is a continuation-in-part of applicant's previous application filed Nov. 20, 1984, Ser. No. 673,511, entitled "Computer Support", the disclosure of such parent application being incorporated herein by reference.

BACKGROUND OF THE INVENTION

Computers and relates equipment such as word processors are often positioned in a corner between two work surfaces extending at an angle, usually a right angle, to each other. This permits the operator access to both work surfaces as well as to the computer, the related equipment and certain accessories. To permit this there is often employed a third work top or a work surface between the angled work surfaces. The third corner work top is expensive and complex, and also requires complex and expensive supporting and interconnecting hardware.

Some space divider systems for interior offices utilize interconnected beams from which work surfaces may be supported in cantilever or extending fashion. It is much easier and simpler to support these surfaces one against the other at the same height at juxtaposed or abutted conditions without providing intermediate or third tops and the associated hardware for corner computer installations.

It is desirable to provide a mounting unit for computers which can be positioned on one or more work surfaces at the same height and which will provide a slightly elevated mounting surface for a variety of computer or word processor components and related accessories, so that they can be firmly supported above the work surface at the desired elevation or position, while also providing a slightly lower forward tray and an articulating arm assembly supporting an additional positional tray for keyboards and other like accessories. Also, instead of providing a third top or surface at such corner which includes a fillet or bridging surface between the work surfaces, it is more economical to provide an accessory which includes not only the mounting unit for the computer and related accessories, but also which provides a fillet bridging the intersection of the work surfaces so that the operator may utilize readily both work surfaces and the corner positioned computer or like equipment.

SUMMARY OF THE INVENTION

The present invention provides a relatively simplified unit which may be attached to corner forming work surfaces and which provides a mounting unit for a computer or like equipment so that such equipment and suitable accessories may be quickly attached thereto. The unit eliminates the need for an expensive and complex intermediate or third top and the requisite hardware.

The mounting unit includes a frame having a slightly elevated plate with attachment points positioned at selected locations whereby computer components or accessories may be positioned and firmly supported directly or indirectly at any of such variety of locations. A forward tray or bridging surface is captured by the frame and extends forwardly of the unit at a lower elevation and serves to bridge the included angle between the adjoining work surfaces. One or more monitor turntables or swing arm supports may be secured to the unit to position the computer and components or accessories at desired locations for effective ergonomic use. The swing arms include a swivel assembly which allows the trays attached to the ends of the swing arms to rotate and angularly adjust relative to the frame. The unit also includes an articulating arm assembly having a positionable tray which may be positioned beneath the bridging surface and forwardly of the bridging surface. The positionable tray includes handles and a pair of adjustable swivels each having rubber bumpers.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

FIG. 4 is an exploded view of the bridging surface and the articulating arm assembly of FIG. 1; and FIG. 5 is a bottom perspective view of the bridging surface and the articulating arm assembly of FIG. 4 with the positionable tray removed.

DETAILED DESCRIPTION OF THE PREFERRED EMBODIMENT

Figure 1:
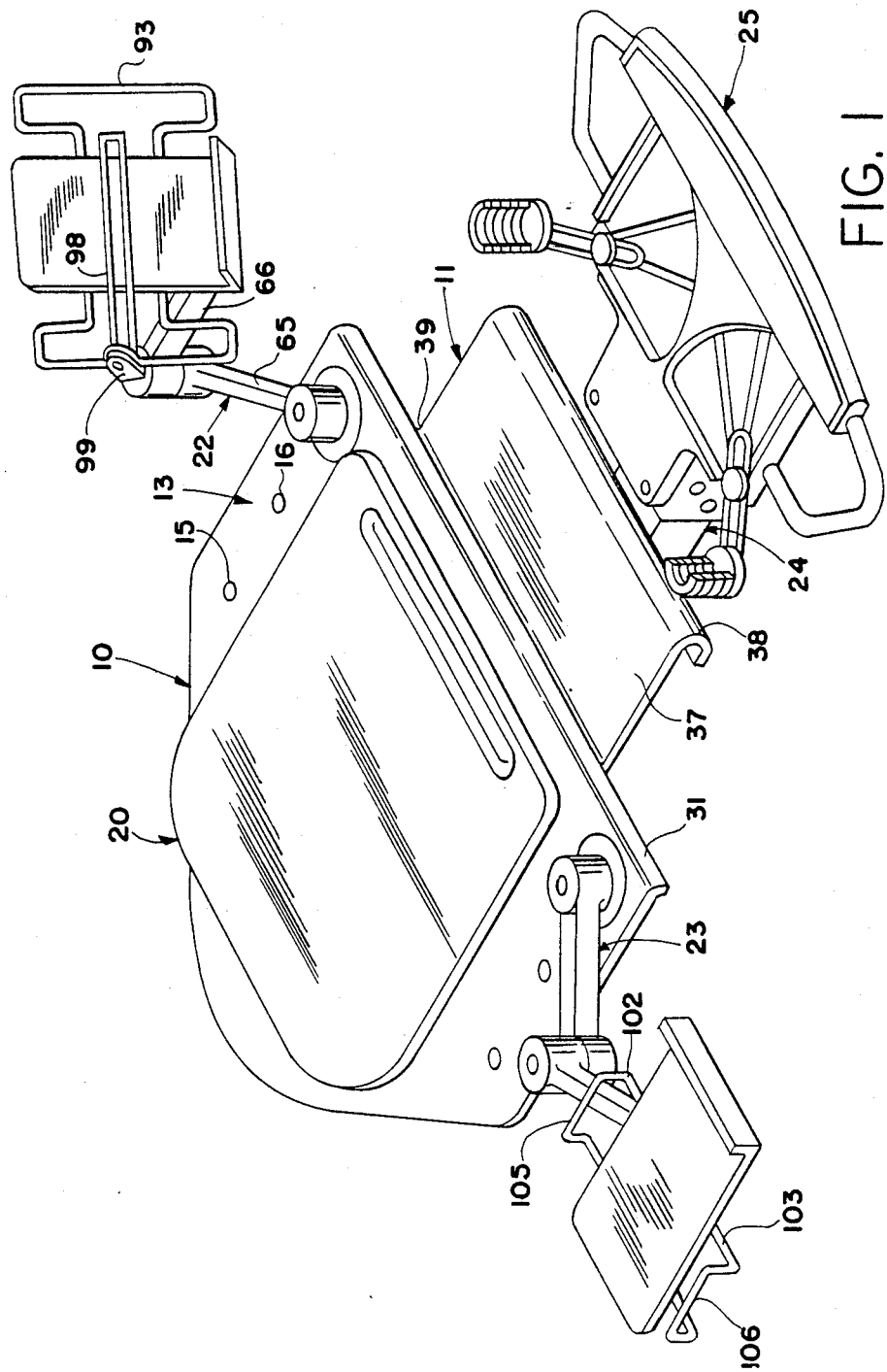
FIG. 1 is a perspective view of one form of the present invention illustrating computer or accessory supports which may be mounted thereon.
Figure 3:
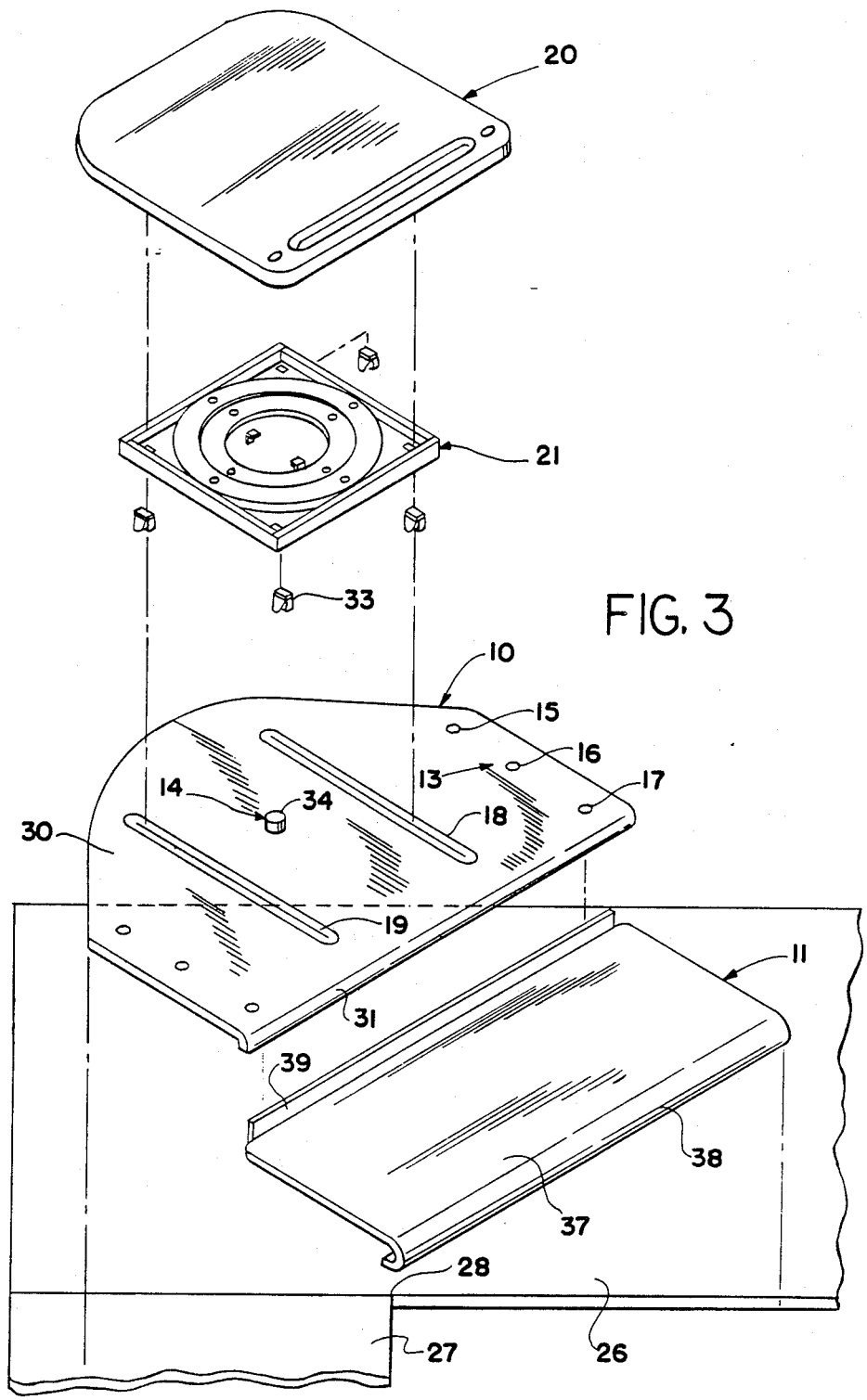
FIG. 3 is a perspective view of a portion of the corner support of FIG. 1 with the bridging surface detached and the monitor support removed showing one form of a turntable mechanism for both the rotation and fore and aft movement of the monitor support.

Referring first to FIGS. 1 and 3 it will be seen that the computer support of the present invention comprises what may be termed a frame or base 10 and a forward tray or bridging surface 11 at a somewhat lower elevation. The frame or base 10 is provided with attachment points positioned at selected locations whereby computer components or accessories may be positioned and firmly supported directly or indirectly at any of such variety of locations. As indicated, there is a center attachment point 14 and three attachment points on each side of the base as seen at 15, 16 and 17, or seven altogether. Also, on each side of the center attachment 14 are parallel stamped depressions or tracks 18 and 19 enabling the turntable to move toward and away from the user.

FIG. 1 also illustrates, by way of example, some of the accessories which may be mounted on and fixed to the base 10 by means of the attachment points, such being an elevated plate or CRT support 20 which may be positioned on top of a conventional turntable 21 and which in conjuction with grooves 18 and 19 permits the monitor support 20 to rotate and move toward and away from the user. Also illustrated is a swing arm support 22 shown in greater detail in FIG. 2 which may be used to support documents or copies thereto. Also illustrated is a swing arm support 23 for a telephone or document holder. Also illustrated is an articulating arm assembly 24 having a positionable tray 25 which may be utilized in lieu of tray 11 or in addition thereto. Articulating arm assembly 24, less the tray 25, is conventional and may be commercially procured.

As seen in FIG. 3, the corner mounting unit is adapted to be supported for quick attachment to two adjoining work surfaces 26 and 27 which are at the same height. Such work surfaces may, for example, be supported in cantilever fashion from beams in a space divider system in the manner shown and illustrated in applicant's copending application, Ser. No. 081,437, filed Oct. 3, 1979, entitled "Space Divider System", which was refiled on Oct. 25, 1985, and was assigned Ser. No. 791,357. Such system is marketed by Sunar-Hauserman of Cleveland, Ohio, U.S.A. under the trademark RACE.

It is noted that the work surfaces may have rounded or rectangular edges and that the end edge of the work surface 27 abuts the front edge of the work surface 26 and forms a corner shown generally at 28 having an included angle of 90°. Although the work surface configuration illustrated is perhaps the most common, it will be appreciated that other corner configurations may be employed having different angles between the front edges of the work surfaces. Other common corner configurations are 120° and 130°. These are now normally closed with a five-sided third top which can be omitted and with the unit of the present invention bridging the area normally occupied by the third top.

The top plate 30 of base unit 10 includes a downturned front edge 31. The base unit may be easily placed on adjoining work surfaces 26 and 27. Although not illustrated, the underside of top plate 30 includes a plurality of supports with plastic pads or feet which elevate the top plate 30 above the work surfaces.

The turntable 21 is slidably mounted upon the top plate 30 by a plurality of plastic rollers 33 which travel within tracks 18 and 19 allowing the turntable 21 to travel forwardly and rearwardly upon top plate 30. The forward and rearward travel of the turntable 21 is limited by stop 34 at attachment point 14.

Mounted on the top of the turntable 21 with suitable fasteners is the monitor support 20. Turntable 21 allows the monitor support to be rotated a full 360° about the axis of the turntable 21.

Captured at the front of the frame 10 by suitable fasteners is the bridging surface 11. The bridging surface 11 includes a top planar surface 37 with a rolled front edge 38. The back of the bridging surface 11 is provided with an upturned flange 39 which simply fits behind the downturned front edge 31 of the top plate 30. The lip 39 positions itself with two small lips (one each side) in the undersurface of base unit 10.

Referring now to FIGS. 4 and 5, there is illustrated the articulating arm assembly 24 having a positionable tray 25 which may be positioned in any one of a variety of positions extending from a position located beneath the bridging surface 11 to a position located forwardly of the bridging surface 11. Rearwardly of the roller front edge 38 on the underside of the tray 11 is provided a C-channel 40 with mounting holes 41 which facilitates with suitable fasteners the mounting of the forward end 42 of the frame 43 of the articulating arm assembly 24. The rearward end 44 of the frame 43 is attached with suitable fasteners directly to the underside of the work surfaces 26 and 27.

Supported beneath the frame 43 is channel 47, are 48, mounting shoe 49 and platform 50. Channel 47 and shoe 49 are pivotally connected to the respective ends of arm 48. Articulating arm assembly 24 is capable of providing various degrees of movement to suit the demands of the individual user. For example, the platform 50 is capable of tilting forwardly and rearwardly relative to the frame 43 by tightening and loosening knob 51. Platform 50 is slidably mounted upon shoe 49 to provide several inches of forward and rearward travel. The positionable tray 25 is preferably pivotally mounted to platform 50 so as to allow a user to swing tray 25 from one side to the other. Manipulation of lever 52 allows the arm 48 to extend on an angle upwardly or downwardly with respect to frame 43. Also, channel 47 is mounted for sliding movement upon frame 44. Thus, when the arm 48 is angled downwardly and the channel 47 is pushed rearwardly along frame 43, th eplatform 50 and the positionable tray 25 attached thereto are disposed below and beneath the bridging surface 11. Alternatively, when the arm 48 is angled upwardly or positioned to extend parallel with the frame 43 and the channel 47 is pulled forwardly along frame 43, the platform 50 and the positionable tray 25 attached thereto are disposed forwardly of the bridging surface 11. Of course, the articulating arm assembly 24 allows the platform 50 and tray 25 to be positioned anywhere along this range of motion.

Positionable tray 25 may comprise any one of a variety of configurations. Preferably, however, tray 25 includes a base 53 having mounted along its lateral edges rails 54. Mounted on the top of the base 53 along its forward edge is a palm rest support 55. Mounted towards the back of the base 53 is a pair of adjustable swivel arms 56. Swivel arms 56 include rubber bumpers 57 which, when positioned adjacent the edges of the work surfaces 26 and 27, prevent the tray 25 from bumping into and possibly damaging the work surfaces 26 and 27. Swivel arms 56 also include slotted extensions 58 which allow the arms 56 to rotate and adjust inwardly and outwardly relative to the base 53. Swivel arms 56 are attached to the base 53 with bolts 59 and nuts 60. Bolts 59 include enlarged heads 61 having grooves 62 for retaining rubber O-rings 63 which provide a good gripping surface for a user's hand facilitating the loosening and tightening of the bolts 59 and thus the adjustment of the position of the swivel arms 56. Preferably, as illustrated recesses 64 are provided in the top of the base 53 such that the tops of the slotted extensions 58 are substantially flush with the top of the base 53.

Figure 2:
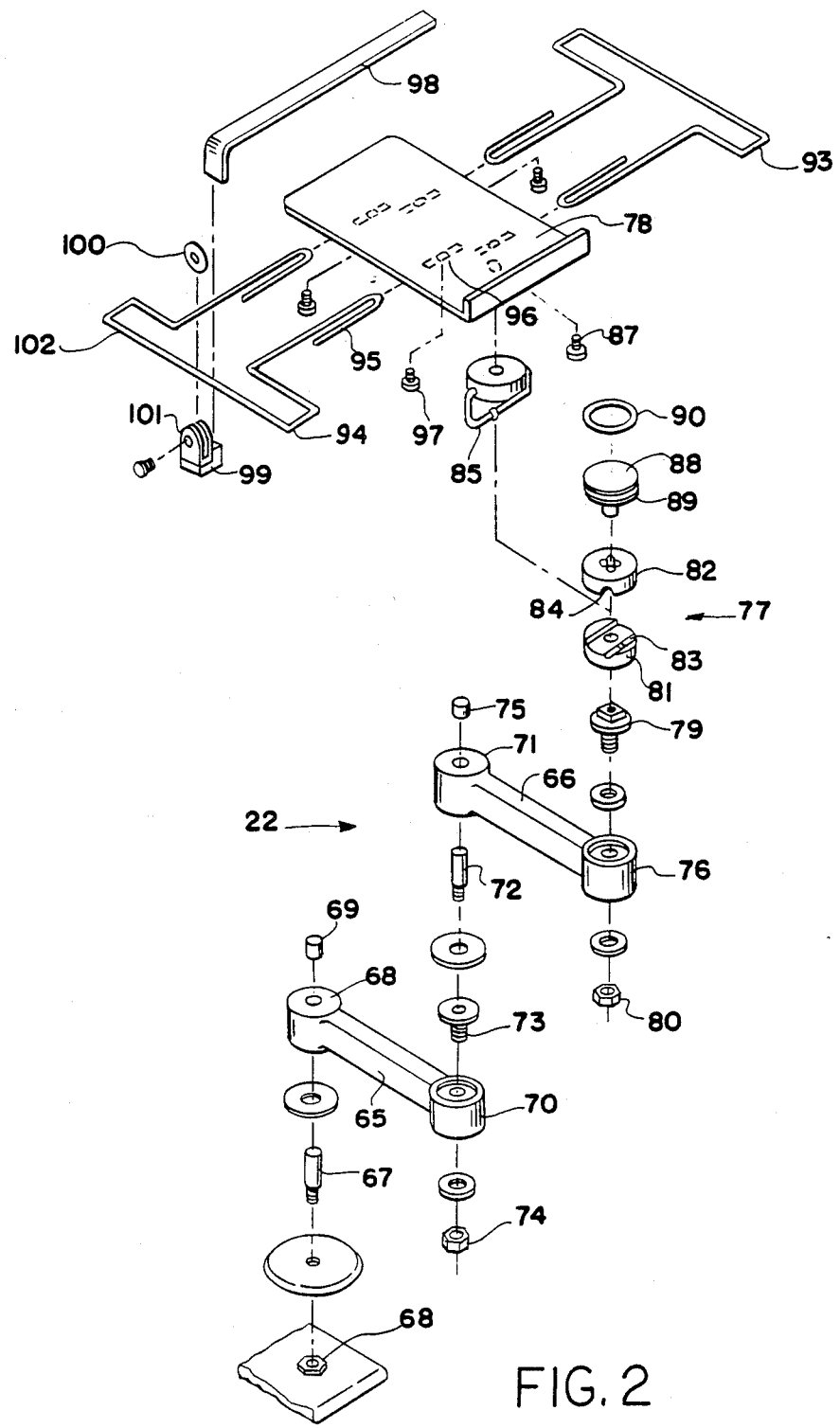
FIG. 2 is an exploded view of one of the swing arm support assemblies shown in FIG. 1 which may be utilized for supporting an accessory for both horizontal positioning and angular adjustment.

Referring now to FIG. 2, there is more clearly illustrated the swing arm support 22 which provides horizontal as well as angular adjustment. Support 22 includes a pair of radially extending arms 65 and 66. One end of arm 65 is attached to the base 10 by a partially threaded shaft 67 which is received within a hole in socket 68. The unthreaded portion of shaft 67 is received within socket 68. Socket 68 is closed and retained on shaft 67 by its own weight and is finished with a plastic end cap 69. The socket 70 at the other end of arm 65 is attached to the socket 71 at the end of arm 66 by a partially threaded shaft 72. The threaded end of shaft 72 is received within mounting bolt 73 which is firmly secured within socket 70 by nut 74. The unthreaded portion of shaft 72 is received within socket 71. Like socket 68, socket 71 is closed and finished with plastic end cap 75. Supported at the other end of arm 66 upon socket 76 is a swivel assembly generally indicated at 77 which supports tray 78. Sockets 68, 70, 71 and 76 all afford 360° of rotation.

Swivel assembly 77 includes a shoulder adapter 79 firmly secured within socket 76 by nut 80. Mounted on top of the shoulder adapter 79 are clamping discs 81 and 82 having grooves 83 and 84 respectively which are adapted to receive the protruding ring 85 of the place holder 86. Place holder 86 is threadedly secured to tray 78 by threaded bolt 87. Extending through the clamping discs 81 and 82 and threadedly secured within the shoulder adapter 79 is the tightener knob 88. Preferably, as illustrated the tightener knob 88 includes a groove 89 for retaining a rubber O-ring 90 which facilitates grasping of the knob 88 by a user.

When the tightener knob 88 is loosened, the ring 85 is free to pivot within the confines of grooves 83 and 84 and the discs 81 and 82 are free to rotate thus allowing the tray 78 to be rotated angularly adjusted. When the tighener knob 88 is tightened, the discs 81 and 82 are clamped together and the ring 85 is frictionally engaged by the walls of grooves 83 and 84 and the place holder 86 and tray 78 are then securely positioned.

Tray 78 includes a pair of extension frames 93 and 94 each having rebent and slotted mounting extensions 95. Tray 78 includes threaded mounting holes 96 to facilitate attachment of the frames 93 and 94 with threaded clamp bolts 97. The threaded mounting holes 96 and slotted mounting extensions 95 permit frames 93 and 94 to adjust inwardly and outwardly a considerable distance with respect to the tray 78. Attached to extension frame 94 is a line guide 98 and line guide holder 99 which includes a grooved roller 100 in clevis 101 which captures rod 102 of frame 94 between the roller and bottom of the clevis. Line guide 98 and holder 99 may be moved along rod 102 by a user to hold documents upon tray 78 and assist a user in reading such documents.

Swing arm support 23 as illustrated in FIG. 1 is essentially identical to support 22 except it includes laterally adjustable frames 103 and 104 which have an upturned rod configuration as indicated at 105 and 106. In this manner the tray can be used to support a telephone or like object. Additionally, frame 104 does not include a line guide and line guide holder, although one could easily be provided.

Although the invention has been shown and described with respect to a certain preferred embodiment, it is obvious that equivalent alterations and modifications will occur to other skilled in the art upon the reading and understanding of the specification. The present invention includes all such equivalent alterations and modifications, and is limited only by the scope of the following claims.

We claim:

1. A mounting unit for computer and like equipment adapted to be positioned on a work surface, said mounting unit comprising a frame adapted to rest atop such work surface adjacent a front edge thereof, said frame including a forward tray adapted to be held by said frame forwardly of said frame and such work surface, and an articulating arm assembly having a positional tray which is adatped to be connected beneath said forward tray and forwardly of said forward tray, said unit having a swing arm support assembly mounted to said frame, said swing arm support assembly including a third tray and a swivel assembly supporting said third tray which allows said third tray to be angularly adjusted relative to said frame, said swivel assembly including a place holder mounted to said third tray, said place holder including a protruding ring, said swivel assembly further including a pair of juxtaposed clamping discs and a tightener knob, each of said clamping discs including a groove adapted to receive and engage a portion of said ring of said place holder between said discs upon the tightening of said tightener knob.

2. A corner mounting unit as set forth in claim 1 wherein said positional tray includes a base having a pair of rails mounted along its lateral edges.

3. A mounting unit as set forth in claim 1 wherein said third tray includes a pair of extension frames each having slotted mounting extensions.

4. A mounting unit as set forth in claim 3 wherein said third tray defines slotted mounting holes to facilitate attachment of said frames.

5. A mounting unit as set forth in claim 3 further including a line guide attached to one of said pair of extension frames.

6. A mounting unit as set forth in claim 5 further including a line guide holder.

7. A corner mounting unit for computer and like equipment adapted to be positioned at the juncture of adjoining work surfaces extending at an angle to each other, said mounting unit comprising a frame having elevated top surface means for extending horizontally over both such work surfaces, bridging plate means adapted to be held by said frame for extending forwardly of said frame and between the edges of the work surfaces at an inner corner therebetween, and an articulating arm assembly adapted to be connected to the work surface and having a positional tray which may be positioned beneath said bridging plate means and forwardly of said bridging plate means, said mounting unit further including a swing arm support assembly mounted to said frame, said swing arm support assembly including a tray and a swivel assembly supporting said tray which allows said tray to be pivoted and thus angularly adjusted relative to said frame, said swivel assembly further including a place holder mounted to said tray, said place holder including a protruding ring, said swivel assembly including a tightener knob having a groove and an O-ring seated within said groove to facilitate the grasping of said tightener knob by a user.

8. A corner mounting unit for computer and like equipment adapted to be positioned at the juncture of adjoining work surfaces extending at an angle to each other, said mounting unit comprising a frame having elevated top surface means for extending horizontally over both such work surfaces, bridging plate means adapted to be held by said frame for extending forwardly of said frame and between the edges of the work surfaces at an inner corner therebetween, and an articulating arm assembly having a positional tray which is adapted to be connected beneath said bridging plate means and forwardly of said bridging plate means, said positional tray including a base having secured thereto an adjustable swivel arm means for preventing said tray from contacting said adjoining work surfaces and to position said tray relative to said work surfaces.

9. A corner mounting unit as set forth in claim 8 wherein said swivel arms include slotted extensions which allow said swivel arms to rotate and adjust inwardly and outwardly relative to said base.

10. A corner mounting unit for computer and like equipment adapted to be positioned at the juncture of adjoining work surface extending at an angle to each other, said mounting unit comprising a frame having elevated top surface means for extending horizontally over both such work surfaces, bridging plate means adapted to be held by said frame for extending forwardly of said frame and between the edges of the work surfaces at an inner corner therebetween, and an articulating arm assembly adapted to be connected to the work surface and having a postional tray which may be positioned beneath said bridging plate means and forwardly of said bridging plate means, said positional tray including a base having a pair of swivel arms secured thereto, said swivel arms each including a rubber bumper and further including slotted extensions which allow said swivel arms to rotate and adjust inwardly and outwardly relative to said base, said base including recesses along its top surface which allow the tops of said slotted arms to be positioned substantially flush with the top of said base.

11. A swing arm support for attachment to a work surface comprising a pair of arms rotatably attached at one of their respective ends, and a swivel assembly rotatably attached to the other of the ends of one of said arms, said swivel assembly connecting a tray to said one arm in such a manner as to allow said tray to rotate and angularly adjust relative to said one arm, said swivel assembly including a pair of clamping discs connected to each other in mating relationship, said swivel assembly further including a place holder mounted to said tray, said place holder including a protruding ring, said clamping disc including grooves offset from the center of said discs which are adapted to receive and engage said ring of said place holder upon the tightening of a tightener knob which clamps said clamping disc to each other.

12. A swing arm support for attachment to a work surface comprising a pair of arms rotatably attached at one of their respective ends, and a swivel assembly rotatably attached to the other of the ends of one of said arms, said swivel assembly connecting a tray to said one arm in such a manner as to allow said tray to rotate and angularly adjust relative to said one arm, said swivel assembly including a pair of clamping discs and further including a place holder mounted to said tray, said place holder including a protruding ring, said clamping discs including grooves which are adapted to receive and engage said ring of said place holder upon the tightening of a tightener knob which clamps said clamping discs together, said tightener knob including a groove and an O-ring retained within said groove to facilitate the tightening of said tightener knob by a user.

13. A swing arm support as set forth in claim 12 wherein said O-ring comprises rubber.

14. A corner mounting unit for computer and like equipment adapted to be positioned at the juncture of adjoining work surfaces extending at an angle to each other, said mounting unit comprising a frame having elevated top surface means for extending horizontally over both such work surfaces, bridging plate means adapted to be held by said frame for extending forwardly of said frame and between the edges of the work surfaces at an inner corner therebetween, and an articulating arm assembly having a positional tray which is adapoted to be connected beneath said bridging plate means and forwardly of said bridging plate means, said positional tray including a base having a swivel arm secured thereto and wherein said base includes a recess along its top surface which allows the top of said swivel arm to be positioned substantially flush with the top of said base.

15. A corner mounting unit as set forth in claim 14 further including a palm rest mounted to said base.

16. A mounting unit for computer and like equipment adapted to be positioned on a work surface, said mounting unit comprising a frame adapted to rest atop such work surface adjacent a front edge thereof, said frame including a forward tray adapted to be held by said frame forwardly of said frame and such work surface, and an articulating arm assembly having a positional tray adapted to be positioned beneath said forward tray and forwardly of said forward tray, said positional tray having a base, said positional tray being pivotable and having means for preventing damaging contact between said tray and said work surface, wherein said means for preventing damaging contact includes a swivel arm adapted for contact with said work surface.

17. A mounting unit as set forth in claim 16, said swivel arm having a slotted extension allowing relative rotation and inward and outward adjustment relative to the base.

* * * * *